(12) United States Patent
Chou

(10) Patent No.: US 7,200,250 B2
(45) Date of Patent: Apr. 3, 2007

(54) SWEEP-TYPE FINGERPRINT SENSOR MODULE

(75) Inventor: Bruce C. S. Chou, Hsin Chu (TW)

(73) Assignee: Lightuning Tech, Inc., Hsinchu (TW)

( * ) Notice: Subject to any disclaimer, the term of this patent is extended or adjusted under 35 U.S.C. 154(b) by 763 days.

(21) Appl. No.: 10/441,022

(22) Filed: May 20, 2003

(65) Prior Publication Data

US 2004/0234110 A1 Nov. 25, 2004

(51) Int. Cl.
*G06K 9/00* (2006.01)
(52) U.S. Cl. .................................... 382/124
(58) Field of Classification Search .............. 283/68, 283/69
See application file for complete search history.

(56) References Cited

U.S. PATENT DOCUMENTS

| | | | |
|---|---|---|---|
| 6,289,114 B1 | 9/2001 | Mainguet | |
| 6,327,376 B1 | 12/2001 | Harkin | |
| 7,110,579 B2* | 9/2006 | Hashimoto | ........... 382/124 |
| 2002/0076089 A1 | 6/2002 | Muramatsu et al. | |
| 2003/0002717 A1* | 1/2003 | Hamid | ........... 382/124 |
| 2003/0002718 A1* | 1/2003 | Hamid | ........... 382/124 |
| 2003/0002719 A1* | 1/2003 | Hamid et al. | ........... 382/124 |
| 2003/0007670 A1* | 1/2003 | Hamid | ........... 382/124 |
| 2003/0035570 A1 | 2/2003 | Benkley, III | |
| 2003/0126448 A1* | 7/2003 | Russo | ........... 713/186 |

FOREIGN PATENT DOCUMENTS

| | | |
|---|---|---|
| DE | 101 09 560 A1 | 9/2002 |
| EP | 1 139 271 A2 | 10/2001 |
| WO | WO 98/58342 A1 | 12/1998 |
| WO | WO 01/94902 A2 | 12/2001 |
| WO | WO 02/061668 A1 | 8/2002 |

* cited by examiner

*Primary Examiner*—Joseph Mancuso
*Assistant Examiner*—Alex Liew
(74) *Attorney, Agent, or Firm*—Birch, Stewart, Kolasch & Birch, LLP

(57) ABSTRACT

A sweep-type fingerprint sensor module includes a microprocessor and a sweep-type fingerprint sensor, which includes a substrate, and a sensing members array, a speed-detecting unit, and a processing circuit on the substrate. The array is composed of plural fingerprint sensing members. When the finger sweeps across the fingerprint sensor, the array sequentially acquires plural fingerprint fragment images from the finger with a sampling time interval. The speed-detecting unit is composed of first and second plate electrodes. The processing circuit processes and then outputs signals from the array and the speed-detecting unit. The microprocessor electrically connected to the processing circuit derives a sweeping speed of the finger by the time difference when the finger sweeps across the sensor surface and sequentially contacts the first and second plate electrodes, determines the sampling time interval and minimize the number of captured fragment images for re-construction of the initial complete fingerprint image.

10 Claims, 6 Drawing Sheets

SWEEP-TYPE FINGERPRINT SENSOR MODULE

BACKGROUND OF THE INVENTION

1. Field of the Invention

The invention relates to a sweep-type fingerprint sensor module and a sensing method therefor, and more particular to a sweep-type fingerprint sensor module having a speed-detecting unit and a sensing method therefor.

2. Description of the Related Art

There are many known techniques of identifying an individual through the identification of the individual's fingerprint. The use of an ink pad and the direct transfer of ink by the thumb or finger from the ink pad to a recording card is the standard way of making this identification. Then, an optical scanner scans the recording card to get an image, which is then compared to fingerprint images in the computer database. However, the most serious drawback of the above-mentioned method is that the fingerprint identification cannot be processed in real-time, and thus cannot satisfy the requirement of real-time authentication, such as network authentication, e-business, portable electronics products, personal ID card, security system, and the like.

The method for reading a fingerprint in real-time has become the important technology in the biometrics market. Conventionally, an optical fingerprint sensor may be used to read a fingerprint in real-time. However, the optical fingerprint sensor has a drawback because it is large in size. Consequently, silicon fingerprint sensors, which overcome the drawbacks of the optical sensor and are formed by silicon semiconductor technology, are developed.

Owing to the finger dimension, the sensing area of the conventional silicon fingerprint sensor is large, for example, it is greater than 9 mm*9 mm. Furthermore, owing to the limitations in manufacturing the silicon integrated circuit, only 50 to 70 good dies may be formed in a 6" wafer. The price of a single fingerprint sensor is greater than at least 10 U.S. dollars when the packaging and testing costs are included. Thus, this expensive price may restrict the silicon fingerprint sensor in various consumer electronics applications such as notebook computers, mobile phones, personal digital assistants, computer peripheral product, or even personal ID cards embedded with the fingerprint sensor.

Consequently, it is possible to reduce one-dimensional width of the conventional, two-dimensional (2D) silicon fingerprint sensor so as to increase the number of good dies and decrease the price of the sensor chip. In this case, the finger sweeps across the sensor surface and the overall finger is sequentially scanned into plural fingerprint fragment images, which are then stitched into a complete fingerprint image.

Mainguet discloses a sweep-type fingerprint sensor formed by pyroelectric or piezoelectric material (pressure-type) and a method for re-arranging plural fragment images in U.S. Pat. No. 6,289,114. However, the method has to disadvantageously acquire many fingerprint fragment images and to re-construct them into a complete fingerprint image because the sensor cannot determine the sweeping speed of the finger. In this case, the microprocessor has to be powerful, the capacity of the memory has to be great enough, and very probable errors may happen due to reconstruction of so many fingerprint fragments.

In the conventional sweep-type fingerprint sensor, the number of sensing members in the Y-axis direction (the sweeping direction of the finger) is preferably decreased in order to reduce the sensor area. In this case, the dimension of the sensor in the Y-axis direction ranges from 0.8 to 1.6 mm. Thus, the number of acquired fingerprint fragment image is great.

FIG. 1 is a schematic illustration showing a finger sweeping across a conventional sweep-type fingerprint sensor. As shown in FIG. 1, a finger 120 sweeps across a sweep-type fingerprint sensor 110 in the Y-axis direction with a speed V, and the sweep-type fingerprint sensor 110 acquires a plurality of fingerprint fragment images.

FIG. 2 is a schematic illustration showing plural fingerprint fragment images acquired by the fingerprint sensor of FIG. 1. As shown in FIG. 2, the acquired fingerprint fragment images II(1) to II(N) may be stitched into a complete fingerprint image of the finger 120. Because the sensing dimension along the sweeping direction of the conventional sweep-type fingerprint sensor is too small, tens to hundreds of images II(1) to II(N) have to be stored. The prior art only acknowledges to design the sweep-type fingerprint sensor with reduced area of the sensor (reduced number of sensing members in the Y-axis direction), so the Y-axis dimension of the sensing members array mostly ranges from 0.8 to 1.6 mm. Furthermore, since the conventional fingerprint sensor does not detect the sweeping speed of the finger and has to take a safety factor into consideration, the overlapped regions AA(1) to AA(N−1) between adjacent images are too large, thereby increasing the number of fragment images and complicating the stitching process.

Regarding about the above-mentioned drawbacks, it is quite difficult for the conventional sweep-type fingerprint sensor module to have minutia points extraction from a recombined fingerprint image due to such many fragment images without errors happening. Therefore, a method in realistic application is to transfer the acquired gray-scale images into the frequency domain, and the advantage of this method resides in that it does not need a lot of image processing steps. However, this method tends to cause high error rate due to the humidity of the finger or contamination on the chip surface.

SUMMARY OF THE INVENTION

It is therefore an object of the invention to provide a sweep-type fingerprint sensor module capable of reducing the number of fragment images for fingerprint re-construction.

Another object of the invention is to provide a sweep-type fingerprint sensor module capable of discriminating if the finger is true or not.

To achieve the above-mentioned objects, the invention provides a sweep-type fingerprint sensor module including a microprocessor and a sweep-type fingerprint sensor, which includes a substrate, and a sensing members array, a speed-detecting unit, and a processing circuit on the substrate. The sensing members array is composed of a plurality of fingerprint sensing members. When the finger sweeps across the sweep-type fingerprint sensor, the sensing members array sequentially acquires plural fingerprint fragment images from the finger with a sampling time interval. The speed-detecting unit is composed of first and second plate electrodes. The processing circuit processes and then outputs signals from the sensing members array and the speed-detecting unit. The microprocessor electrically connected to the processing circuit derives a sweeping speed of the finger by the time difference when the finger sweeps across the sensor surface and sequentially contacts the first and second plate electrodes. Detection of sweeping speed can control the sampling time interval of image catching, minimize the number of captured fingerprint fragment images, and easily construct the fingerprint fragment images into a complete fingerprint image.

To achieve the above-mentioned objects, the invention also provides a sensing method for a sweep-type fingerprint sensor module. The method includes the steps of: detecting a sweeping speed of a finger; determining a sampling time interval according to the sweeping speed; sequentially acquiring a plurality of fingerprint fragment images from the finger with the sampling time interval, and outputting a plurality of fingerprint fragment signals corresponding to the fingerprint fragment images; and stitching the plurality of fingerprint fragment signals into a complete fingerprint image.

By detecting the sweeping speed of the finger, the number of acquired fingerprint fragment images may be effectively reduced, the image processing may be simplified, and the cost may be decreased.

DETAILED DESCRIPTION OF THE INVENTION

Figure 1:
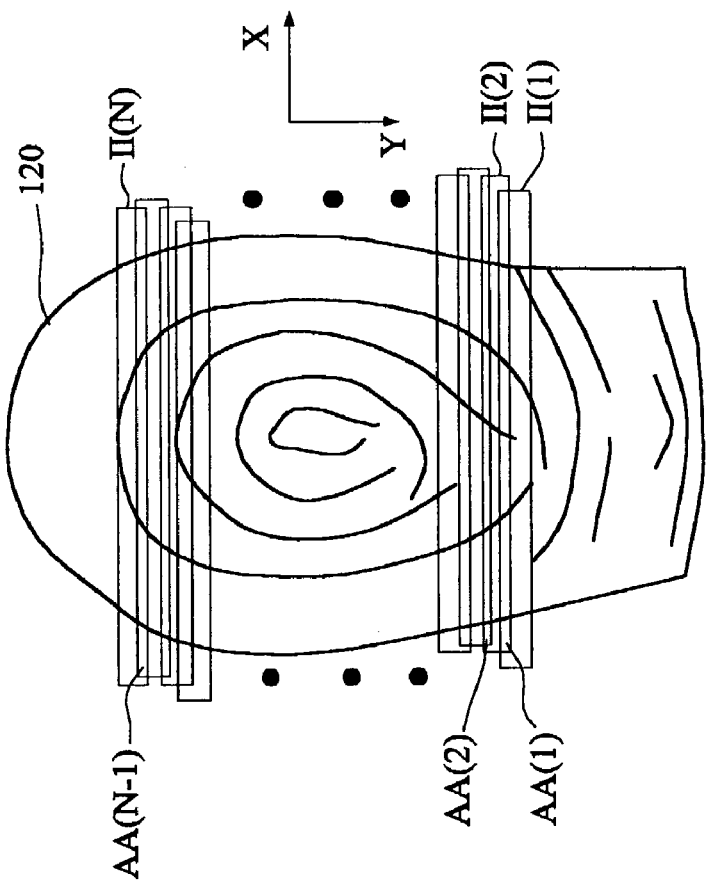
FIG. 1 is a schematic illustration showing a finger sweeping across a conventional sweep-type fingerprint sensor.
Figure 2:
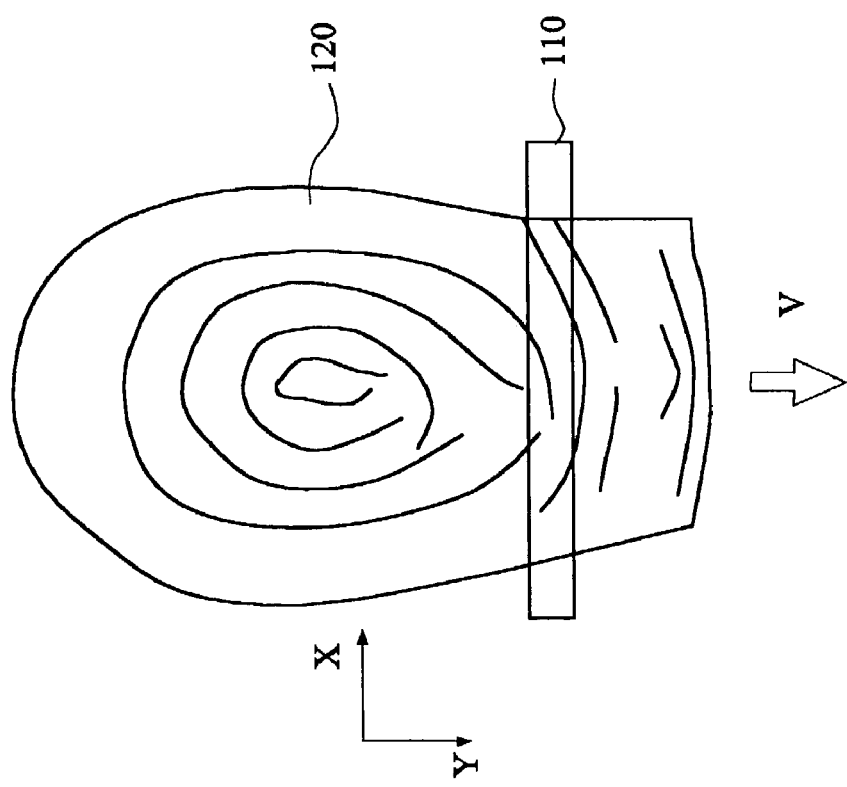
FIG. 2 is a schematic illustration showing plural fingerprint fragment images acquired by the fingerprint sensor of FIG. 1.
Figure 4:
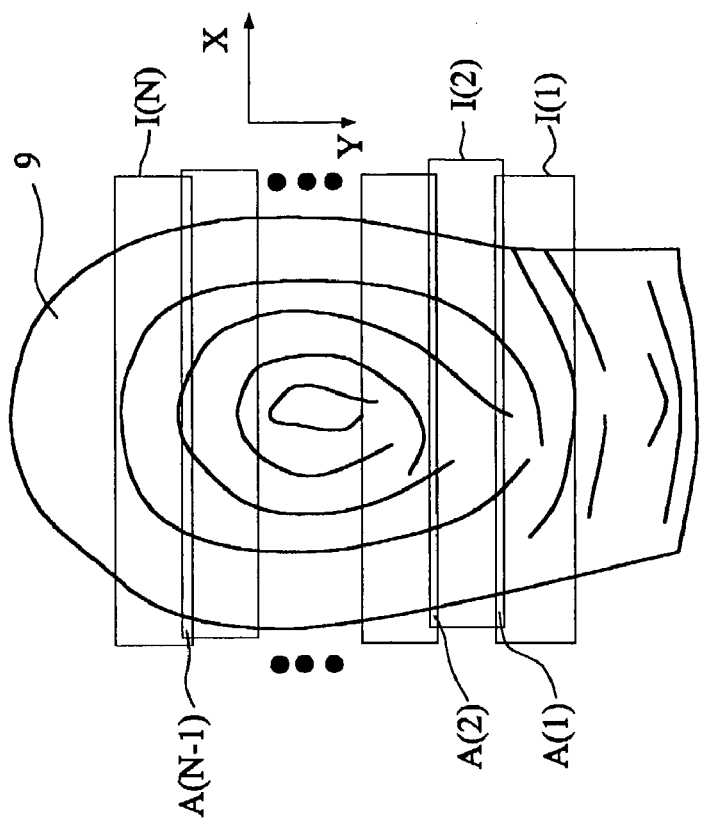
FIG. 4 is a schematic illustration showing plural fingerprint fragment images acquired by the fingerprint sensor of FIG. 3.
Figure 3:
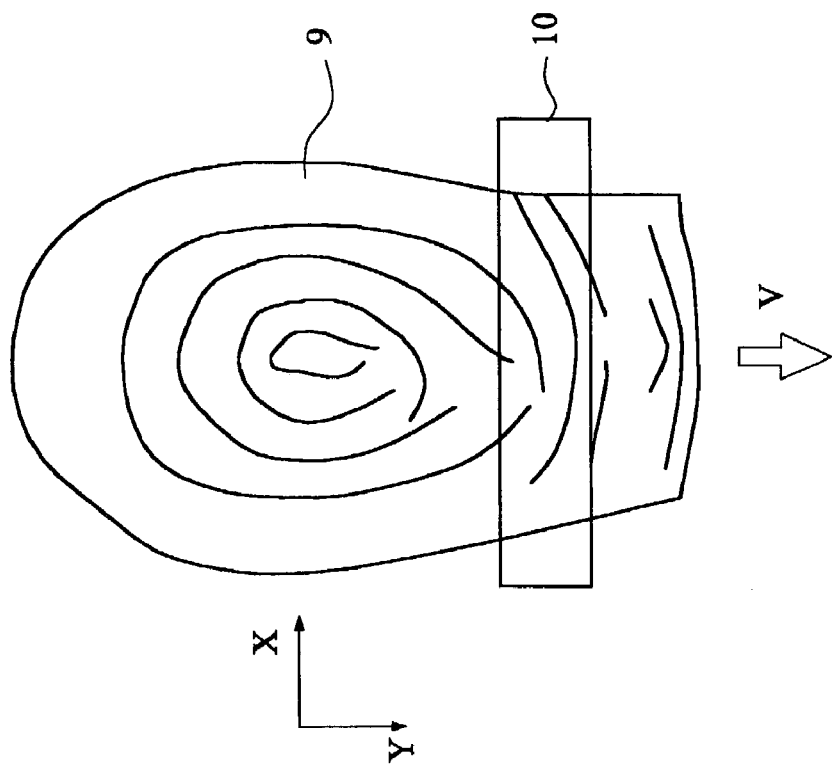
FIG. 3 is a schematic illustration showing a finger sweeping across a sweep-type fingerprint sensor of the invention.

FIG. 3 is a schematic illustration showing a finger sweeping across a sweep-type fingerprint sensor of the invention, and FIG. 4 is a schematic illustration showing plural fingerprint fragment images acquired by the fingerprint sensor of FIG. 3. As shown in FIGS. 3 and 4, when a finger 9 sweeps across a sweep-type fingerprint sensor 10 at a speed V, the sweep-type fingerprint sensor 10 helps to detect the speed V of the finger 9, and acquires a plurality of fingerprint fragment images I(1) to I(N) according to the speed V, wherein N is a positive integral. The overlapped regions between adjacent two fingerprint fragment images are A(1) to A(N−1). The invention to be disclosed is suitable for minutia points extraction and matching, as will be discussed later.

The above-mentioned sensor may be embedded into any platform of any application device. When the finger 9 is placed on the platform and sweeps along the direction indicated by the arrow, the sensor 10 may sequentially acquire the fingerprint fragment images, which may be re-arranged into a complete fingerprint image for verification or identification. Since the sweeping speed of the finger may be regarded as a constant speed within the entire sweeping movement or within a predetermined distance, obtaining the sweeping speed V may facilitate the adjustment of the time interval in acquiring the images so as to re-construct a full fingerprint image according to a minimum number of fragment images. In this case, it is not necessary to use a microprocessor with powerful functions or a memory with large capacity, and it is also possible to greatly reduce the possibility of recognition errors, decrease the cost of the sensor and the recognition system, and effectively popularize the application areas of the sensor.

Figure 5:
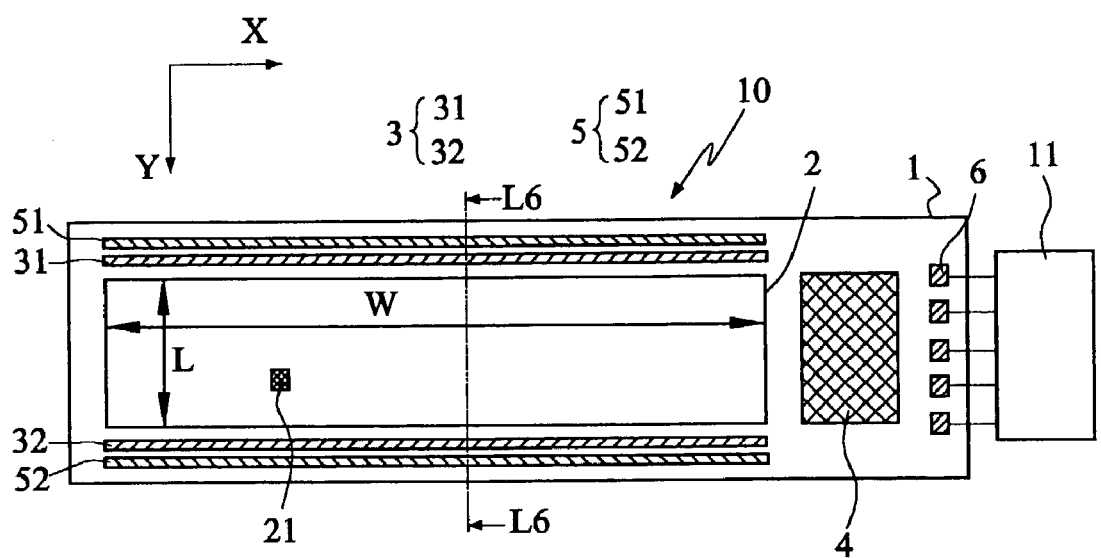
FIG. 5 is a top view showing a sweep-type fingerprint sensor module according to a first embodiment of the invention.
Figure 6:
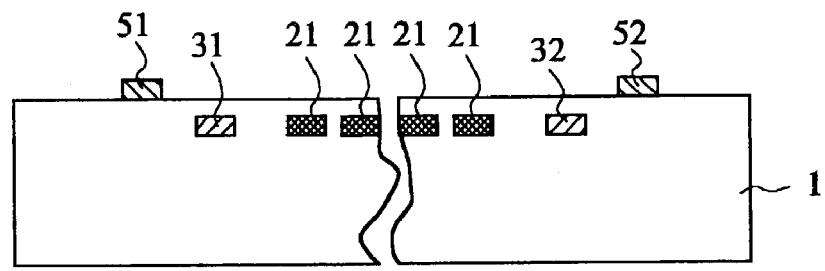
FIG. 6 is a cross-sectional view taken along a line L6—L6 of FIG. 5.
Figure 7:
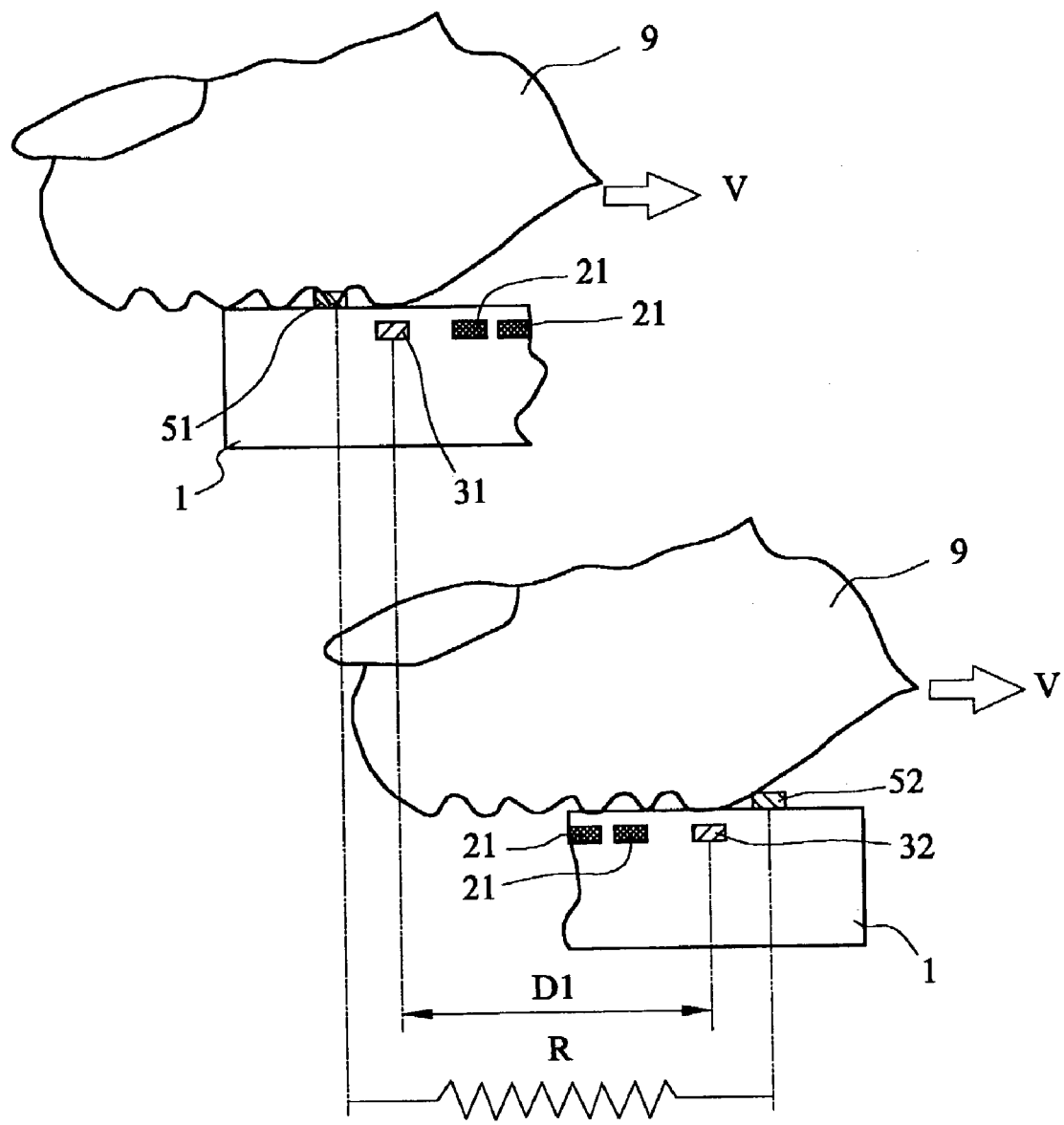
FIG. 7 is a side view showing the sweep-type fingerprint sensor in operation according to the first embodiment of the invention.

FIG. 5 is a top view showing a sweep-type fingerprint sensor module according to a first embodiment of the invention, FIG. 6 is a cross-sectional view taken along a line L6—L6 of FIG. 5, and FIG. 7 is a side view showing the sweep-type fingerprint sensor in operation according to the first embodiment of the invention. It is to be noted that the dimensions of the finger and sensor are not depicted in die real scale. Referring to FIGS. 5 to 7, the sweep-type fingerprint sensor module of the invention includes a microprocessor 11 and a sweep-type fingerprint sensor 10 electrically connected to the microprocessor 11. The sweep-type fingerprint sensor 10 includes a substrate 1, a sensing members array 2, a speed-detecting unit 3, a processing circuit 4, an impedance sensor 5, and a plurality of bonding pads 6. The bonding pads 6 are electrically connected to the microprocessor 11. The sensing members array 2 is formed on the substrate 1 and is composed of a plurality of fingerprint sensing members 21 arranged in a two-dimensional array. It is to be noted that only one sensing member is depicted in the drawing for the sake of simplicity. Each of the fingerprint sensing members 21 may be a capacitive sensing member, a capacitive pressure sensing member, or a thermoelectric sensing member, as described in the commonly-owned, co-pending patent applications:

1. U.S. patent application Ser. No. 10/403,052, filed Apr. 1, 2003 and entitled "CAPACITIVE FINGERPRINT SENSOR;"

2. Taiwan Patent Application Serial No. 91110443, filed on May 17, 2002 and entitled "CAPACITIVE PRESSURE FINGERPRINT SENSOR AND A METHOD FOR MANUFACTURING THE SAME;" and 3. Taiwan Patent Application Ser. No. 90113755, filed on Jul. 6, 2001 and entitled "THERMOELECTRIC SENSOR FOR FINGERPRINT THERMAL IMAGING."

In order to match with the dimension of the finger 9, the lateral (X-axis direction) dimension of the sensing members array 2 is at least greater than 8 mm, and the optimum longitudinal (Y-axis direction) dimension ranges from 2.5 to 3.5 mm, which will be described later. A plurality of sensing signals from the sensing members array 2 is processed by the processing circuit 4 and communicates with the outside via the input/output bonding pads 6. The processing circuit 4 basically includes a logic control circuit, a programmable gain amplifier, and an analog-to-digital converter, the corresponding detailed architectures of which have been described in the patent applications of "CAPACITIVE FINGERPRINT SENSOR" and "CAPACITIVE PRESSURE FINGERPRINT SENSOR AND A METHOD FOR MANUFACTURING THE SAME."

The sensing members array 2 senses a fingerprint when a finger 9 (FIG. 3) sweeps across the sensing members array 2, sequentially acquires a plurality of fingerprint fragment images from the finger with a sampling time interval, and then outputs a plurality of fingerprint fragment signals corresponding to the fingerprint fragment images.

In order to overcome the drawbacks of the prior art, the speed-detecting unit 3 is embedded in the sweep-type fingerprint sensor of the invention. The speed-detecting unit 3 is also formed on the substrate 1 and is composed of a first plate electrode 31 and a second plate electrode 32. The first and second plate electrodes 31 and 32 are disposed out of the sensing members array 2 and substantially parallel to each other and are spaced apart by a predetermined distance D1. The plate electrodes are positioned at two sides (upper and lower sides) of the sensing members array 2, respectively, and each has a length substantially equal to the length of the sensing members array 2 in the X-axis direction. The first plate electrode 31 outputs a first time signal when it contacts the finger 9, and the second plate electrode 32 outputs a second time signal when it contacts the finger 9. The first time signal and the second time signal are different from the fingerprint fragment signals. The speed-detecting unit 3 and the sensing members array 2 pertain to different parts. Each of the first and second plate electrodes 31 and 32 is longer than each of the fingerprint sensing members 21.

Specifically speaking, when the finger 9 sweeps in the Y-axis direction, the finger 9 passes over the first plate electrode 31 to form a trigger capacitance together with the first plate electrode 31 (the corresponding detailed circuit and principle have been described in the patent application of "CAPACITIVE FINGERPRINT SENSOR"), and then a trigger pulse is generated. The trigger pulse may turn on the power of the fingerprint sensor so as to reduce unnecessary power consumption when the sensor is not used. Next, the finger 9 sweeps across the surface the sensing members array 2 and passes over the second plate electrode 32, and another trigger pulse is also generated. Since the distance D1 between the first and second plate electrodes 31 and 32 is known, the sweeping speed V of the finger 9 may be derived after the time difference between the two trigger pulses is calculated. In this embodiment, the sweeping speed V is calculated by the microprocessor 11.

After the microprocessor 11 derives the sweeping speed of the finger 9, the sampling time interval used to acquire the fingerprint fragment images may be calculated. Then, the fingerprint fragment images may be received and processed. Consequently, it is unnecessary to store too many fingerprint fragment images, the microprocessor needs not to have powerful processing speed, and the cost of the module may be advantageously reduced.

Thus, the invention considers both the property and cost of the fingerprint sensor and optimizes the dimension of the sensing members array 2 in the Y-axis direction as ranging from 2.5 to 3.5 mm. In this embodiment, the dimension W in the X-axis direction is 10 mm, and the dimension L in the Y-axis direction is 3.2 mm. In this case, there are 200*64 pixels in the sensing members array 2 with a resolution of 500 DPI. This is because an overlapped length ranging from about 400 to 800 microns in the Y-axis direction has to be provided as a judgement basis for stitching two fingerprint fragment images. The overlapped regions are illustrated as A(1) to A(N−1), as shown in FIG. 4. In the case of the conventional sensing members array having the length ranging from 0.8 to 1.6 mm in the Y-axis direction, most of the area is wasted in the overlapped region. Thus, a lot of fragment images are needed to get a complete image. The invention may optimize the Y-axis dimension of the sensing members array 2 as ranging from 2.5 to 3.5 mm by way of sweeping speed detection of the finger, and the stitched image is shown in FIG. 4. In addition to the overlapped region, the unoverlapped region of the image has a length ranging from 1.5 to 2.5 mm in the Y-axis direction. Thus, a complete image may be obtained by stitching 3 to 5 or 7 to 9 fragment images. Consequently, the required number of fingerprint fragment images may be greatly reduced, and the fragment images may be pieced together according to the stable and commonly used method of minutia extraction and matching.

The processing circuit 4 is electrically connected to the sensing members array 2 and the speed-detecting unit 3 to receive and process the plurality of fingerprint fragment signals, the first time signal, and the second time signal. Then, the processed signals are output to the microprocessor 11 via the bonding pads 6. The microprocessor 11 derives a sweeping speed V of the finger 9 according to the first time signal, the second time signal, and the predetermined distance D1, determines the sampling time interval according to the sweeping speed V, and further processes and reconstructs the plurality of fingerprint fragment signals into a complete fingerprint image.

The impedance sensor 5 is formed on the substrate 1 to sense the impedance of the finger 9 skin to discriminate if the finger 9 is true or not. The impedance sensor 5 includes a pair of exposed metallic, long electrodes 51 and 52. When the finger 9 is placed on the two electrodes 51 and 52, the impedance R of the finger 9 skin may be detected and recorded in the microprocessor. Since the impedance of a fake finger or a dead finger is different from a true and live finger, the true/false condition of the finger may be recognized by the processing of the microprocessor 11.

Figure 8:
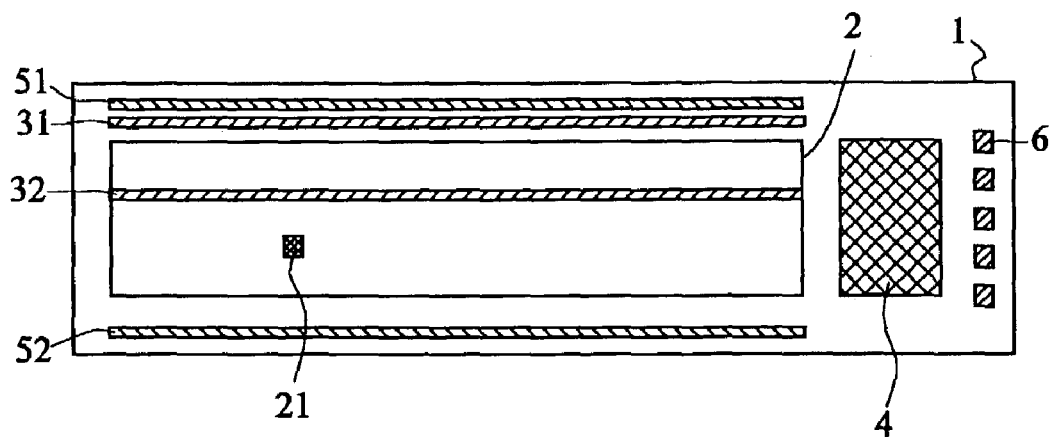
FIG. 8 is a top view showing a sweep-type fingerprint sensor according to a second embodiment of the invention.

FIG. 8 is a top view showing a sweep-type fingerprint sensor according to a second embodiment of the invention. As shown in FIG. 8, the second embodiment is similar to the first embodiment except for the difference residing in that the second plate electrode 32 in the second embodiment is positioned in the sensing members array 2 while the first plate electrode 31 is positioned at a longitudinal side (upper side) of the sensing members array 2. In this case, the second plate electrode 32 may be integrated with a metal mesh of the sensing members array.

Figure 9:
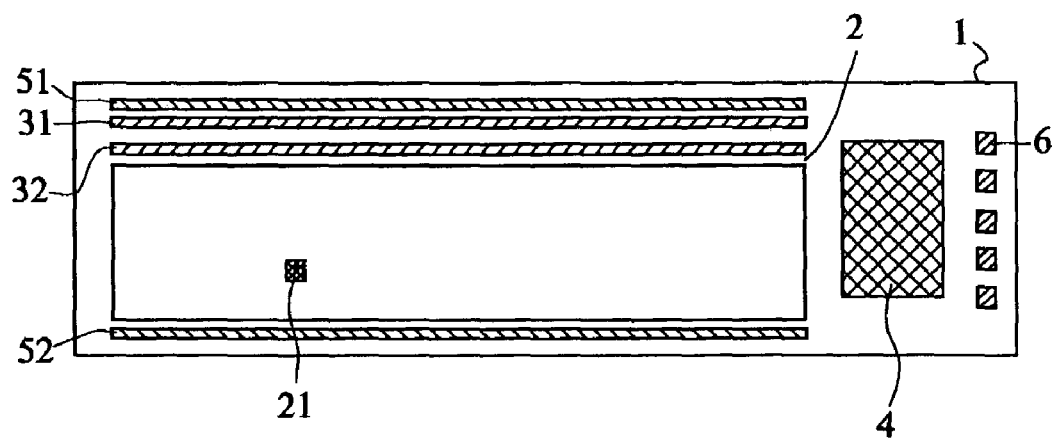
FIG. 9 is a top view showing a sweep-type fingerprint sensor according to a third embodiment of the invention.

FIG. 9 is a top view showing a sweep-type fingerprint sensor according to a third embodiment of the invention. As shown in FIG. 9, the third embodiment is similar to the first embodiment except for the difference residing in that the first and second plate electrodes 31 and 32 in the third embodiment are positioned at the same longitudinal side (upper side) of the sensing members array 2.

Similarly, the first and second plate electrodes 31 and 32 also may be positioned in the sensing members array 2.

Figure 10:
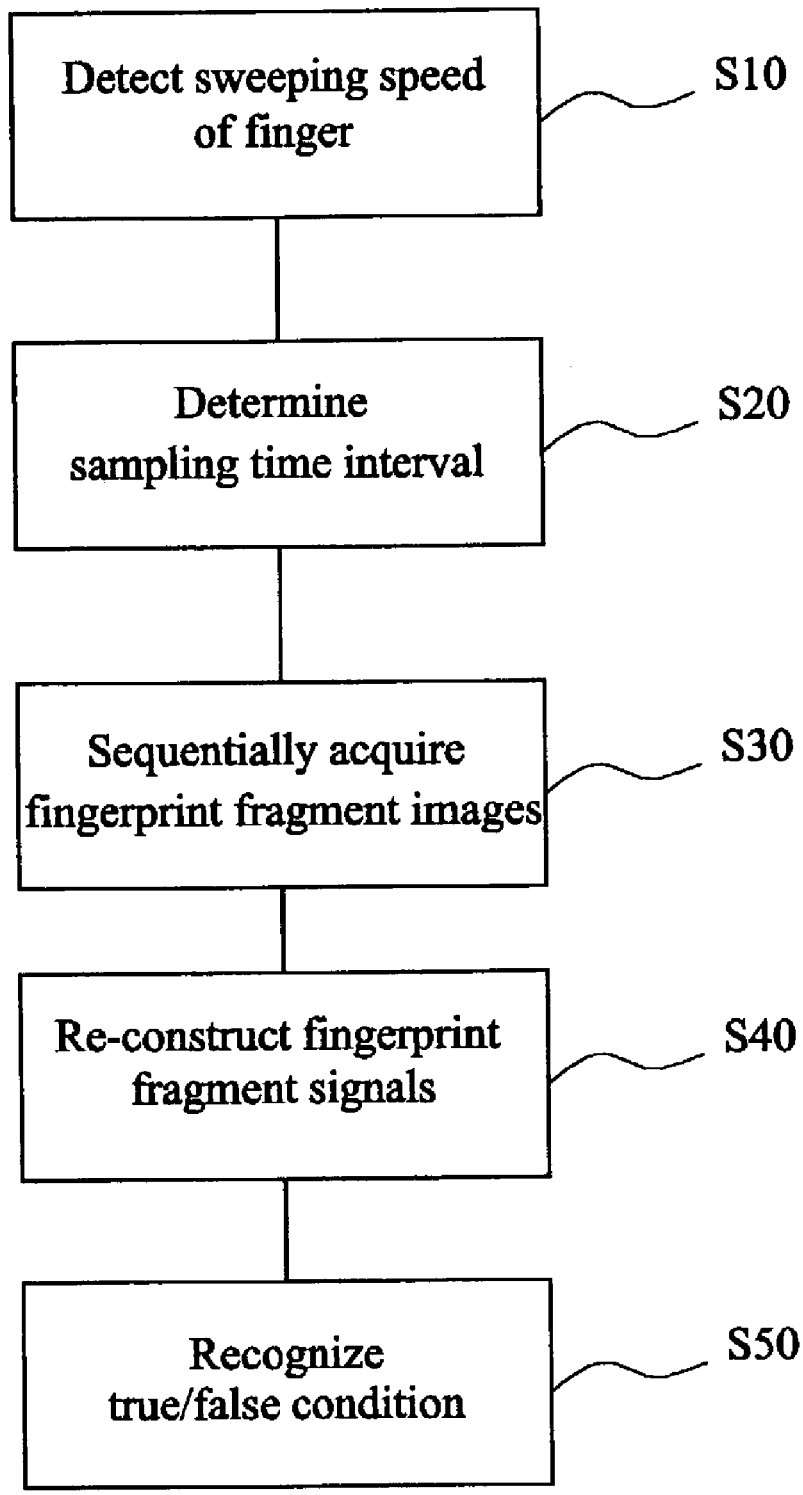
FIG. 10 is a flow chart showing a sensing method for the sweep-type fingerprint sensor of the invention.

FIG. 10 is a flow chart showing a sensing method for the sweep-type fingerprint sensor of the invention. Referring to FIG. 10, the sensing method for the sweep-type fingerprint sensor of the invention includes the following steps.

In step S10, a sweeping speed V of the finger 9 is detected. First, when the finger 9 contacts the first plate electrode 31, a first time signal is output. Next, when the finger 9 contacts the second plate electrode 32, which is spaced from the first plate electrode 31 by the predetermined distance D1, a second time signal is output. Then, the sweeping speed V may be obtained by dividing the predetermined distance D1 by the time difference between the first and second time signals.

In step S20, a sampling time interval is determined according to the sweeping speed V. First, an effective length is obtained by subtracting an overlapped length (determined by the fingerprint image processing software) between two adjacent fingerprint fragment images from an image length (Y-axis length of the sensing members array) of each fingerprint fragment image in a sweeping direction of the finger. Then, the sampling time interval is obtained by dividing the effective length by the sweeping speed.

In step S30, a plurality of fingerprint fragment images of the finger 9 is sequentially acquired with the sampling time interval. Then, a plurality of fingerprint fragment signals corresponding to the fingerprint fragment images is output accordingly.

In step S40, the plurality of fingerprint fragment signals is re-constructed into a complete fingerprint image.

In step S50, an impedance of the finger skin is detected to recognize the true/false condition of the finger.

Consequently, the invention detects the sweeping speed of the finger to determine the sampling time interval for the fingerprint fragment images so as to effectively reduce the number of fingerprint fragment images, simplify the image processing, and reduce the sensor cost.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sweep-type fingerprint sensor module, comprising:
    a microprocessor; and
    a sweep-type fingerprint sensor, which is electrically connected to the microprocessor and comprises:
        a substrate;
        a sensing members array formed on the substrate and composed of a plurality of fingerprint sensing members arranged in a two-dimensional array, the sensing members array sensing a fingerprint when a finger sweeps across the sensing members array, sequentially acquiring a plurality of fingerprint fragment images of the finger with a sampling time interval, and outputting a plurality of fingerprint fragment signals corresponding to the fingerprint fragment images accordingly;
        a speed-detecting unit formed on the substrate and composed of a first plate electrode and a second plate electrode, the first and second plate electrodes being disposed out of the sensing members array, substantially parallel to each other and spaced apart by a predetermined distance, the first plate electrode outputting a first time signal when it contacts the finger, and the second plate electrode outputting a second time signal when it contacts the finger, wherein the first time signal and the second time signal are different from the fingerprint fragment signals, the speed-detecting unit and the sensing members array pertain to different parts, and each of the first and second play electrodes is longer than each of the fingerprint sensing members; and
        a processing circuit electrically connected to the sensing members array and the speed-detecting unit to receive, process and then output the plurality of fingerprint fragment signals, the first time signal, and the second time signal, wherein the microprocessor derives a sweeping speed of the finger according to the first time signal, the second time signal, and the predetermined distance, determines the sampling time interval according to the sweeping speed, and re-constructs the plurality of fingerprint fragment signals into a complete fingerprint image.

2. The sweep-type fingerprint sensor module according to claim 1, wherein the sensing members array has a dimension ranging substantially from 2.5 to 3.5 mm in a sweeping direction of the finger.

3. The sweep-type fingerprint sensor module according to claim 1, wherein the first and second plate electrodes are positioned at an upper side and a lower side of the sensing members array, respectively.

4. The sweep-type fingerprint sensor module according to claim 1, wherein the first and second plate electrodes are positioned at the same longitudinal side of the sensing members array.

5. The sweep-type fingerprint sensor module according to claim 1, wherein the sweep-type fingerprint sensor further comprises an impedance sensor formed on the substrate to sense an impedance of the finger to discriminate if the finger is true or not.

6. The sweep-type fingerprint sensor module according to claim 1, wherein the impedance sensor includes two long electrodes.

7. The sweep-type fingerprint sensor module according to claim 1, wherein the sweep-type fingerprint sensor further comprises:
    a plurality of bonding pads formed on the substrate and electrically connected to the microprocessor.

8. The sweep-type fingerprint sensor module according to claim 1, wherein the sensing members array is composed of a plurality of capacitive sensing members arranged in a two-dimensional array.

9. The sweep-type fingerprint sensor module according to claim 1, wherein the sensing members array is composed of a plurality of thermoelectric sensing members arranged in a two-dimensional array.

10. The sweep-type fingerprint sensor module according to claim 1, wherein the sensing members array is composed of a plurality of capacitive pressure sensing members arranged in a two-dimensional array.

* * * * *